March 3, 1942.  J. D. RYDER  2,275,317

MEASURING AND CONTROLLING APPARATUS

Filed Jan. 17, 1939  3 Sheets-Sheet 1

Inventor
JOHN D. RYDER
By Raymond D. Jenkins
Attorney

March 3, 1942.　　　　J. D. RYDER　　　　2,275,317
MEASURING AND CONTROLLING APPARATUS
Filed Jan. 17, 1939　　　　3 Sheets-Sheet 2

Inventor
JOHN D. RYDER
By Raymond D. Junkins
Attorney

March 3, 1942.  J. D. RYDER  2,275,317
MEASURING AND CONTROLLING APPARATUS
Filed Jan. 17, 1939  3 Sheets-Sheet 3
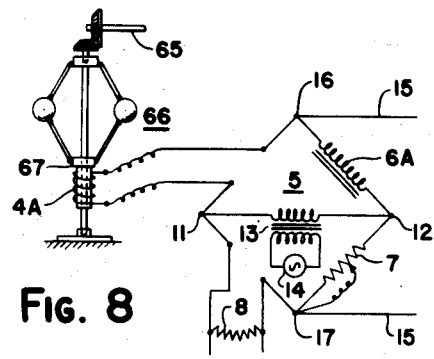
Fig. 8
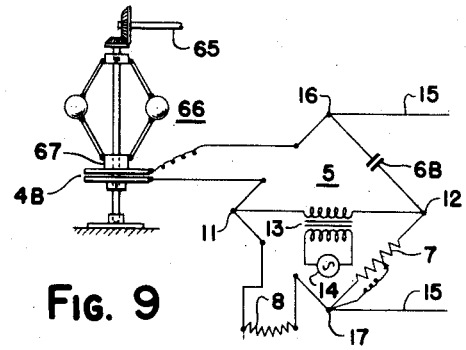
Fig. 9
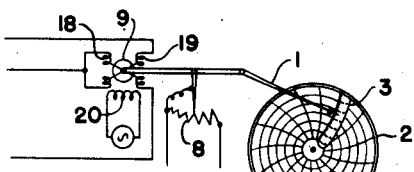
Fig. 10
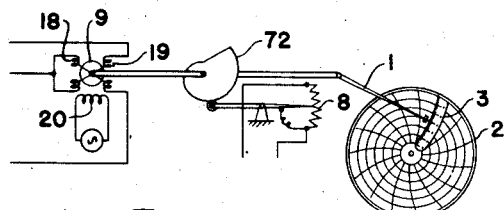
Fig. 11
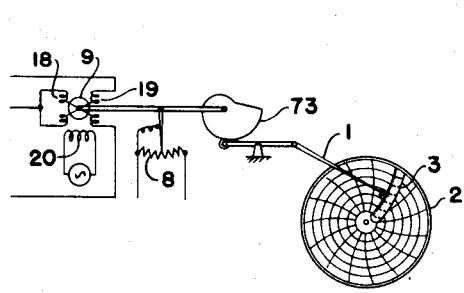
Fig. 12
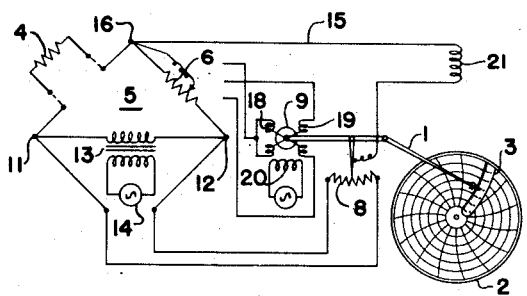
Fig. 13
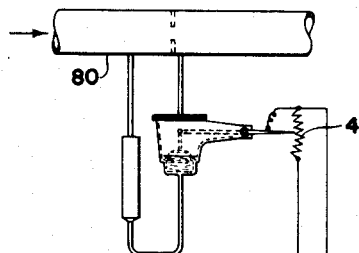
Fig. 14
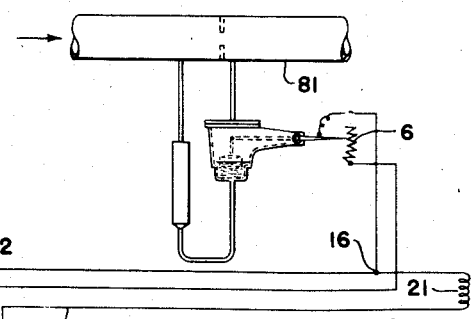
Inventor
JOHN D. RYDER
By Raymond D. Junkin
Attorney Patented Mar. 3, 1942

2,275,317

UNITED STATES PATENT OFFICE 2,275,317

MEASURING AND CONTROLLING APPARATUS

John D. Ryder, University Heights, Ohio, assignor to Bailey Meter Company, a corporation of Delaware Application January 17, 1939, Serial No. 251,388

18 Claims. (Cl. 236—74)

This invention relates to apparatus for exhibiting and/or controlling the magnitude of a variable of a physical, chemical or electrical nature, such as pressure, temperature, rate of fluid flow, electromotive force, etc.

In accordance with my invention variations in the variable are translated into variations in an electrical effect and this effect amplified solely through electrical means until sufficient power is available for doing useful work, such as moving an indicator or other exhibiting means or for regulating the rate of application of an agent contributing to the production or maintenance of the variable.

In devices of the same general type at present known wherein variations in the variable are translated into variations in an electrical effect, the necessary amplification is done, at least in part, by mechanical means. We thus have variations in magnitude of the variable translated into variations in an electrical effect, which is then translated into a corresponding mechanical movement, such as the deflection of a galvanometer, and thence usually the mechanical movement is translated back into an electrical effect for operating the exhibiting or control device. Because of the small power available in the first electrical effect such devices usually operate on the step by step principle. That is to say, upon a change in the variable the exhibiting or control device is not continuously operated in correspondence with such changes, but periodically by means of a feeler mechanism the exhibiting or control device is changed an amount corresponding to the amount of change in the variable during succeeding increments of time. For a description of a device of this type reference may be made to my United States Patent No. 2,015,968.

It is evident that such devices are necessarily complicated and delicate and do not correctly exhibit the variable during transient periods. My invention is particularly concerned with the elimination of all mechanical movements between the sensitive device and the exhibiting or control device, leading to simplification and removal of the usual time delay, so that the device accurately exhibits the magnitude of the variable even during transient periods. It is evident that many ancillary advantages will follow, among which may be mentioned as obvious the elimination of wear of mechanical parts and elimination of the necessity for periodic inspection and adjustment to correct for inaccuracies occasioned by the mechanical wear. For a complete understanding of my invention reference should be made to the description to follow and the drawings in which:

Figs. 5, 6, 7, 8 and 9 illustrate the application of my invention to typical variables.

Figs. 10, 11, 12 and 13 illustrate various means for correcting for a non-lineal relation which may exist between changes in the variable and corresponding changes in the electrical effect produced thereby.

Fig. 14 illustrates the application of my invention to determine the ratio between two variables.

Figure 1:
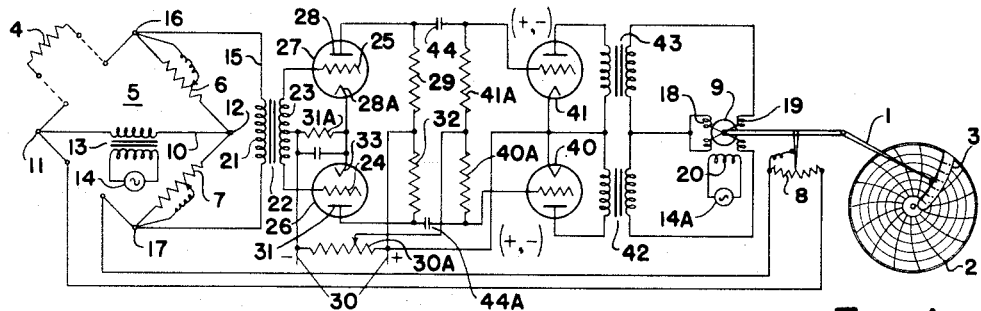
Fig. 1 is a diagrammatic arrangement of apparatus and electric circuit embodying my invention.

Referring now to Fig. 1, I have illustrated my invention arranged to visually exhibit by means of a movable index 1 and cooperating time revoluble chart 2 and scale 3 the magnitude of a variable impedance 4. The index, chart and scale are merely specific forms of exhibiting means which may take a wide variety of other forms as will be evident to those skilled in the art. The variable impedance 4 is shown specifically as a resistance which may be made sensitive to a variable, such as temperature for example, which it is desired to visually exhibit. It is evident, however, as will be pointed out in greater detail hereinafter that the impedance to which the apparatus is responsive may be made sensitive to any variable which it is desired to measure and/or control. Broadly, therefore, my invention contemplates the use of any impedance such as a resistance, condenser, inductance which may be used to produce an electrical effect varying in correspondence with the variable which it is desired to measure and/or control.

To provide an accurate and sensitive measuring system I preferably employ the null or zero balance method wherein a variable effect of measurable value is maintained equal to or in some predetermined proportion to the electrical effect produced by the variable, and hence becomes a measure of the variable. In the embodiment shown in Fig. 1 I employ an alternating current Wheatstone bridge generally indicated at 5 and having as ratio arms the resistance 4 and adjustable resistances 6, 7 and 8. The resistance 8, which is moved in consonance with the index 1 by a motor 9, is the balancing resistance and through means hereinafter described is continuously varied to maintain the bridge in balance, and hence the magnitude thereof becomes a measure of the resistance 4, and inferentially of the variable to which the latter is sensitive.

The bridge 5 is provided with a conjugate conductor 10 connecting diagonally opposite points 11 and 12 of the bridge and which is inductively coupled through a transformer 13 to a source of alternating current 14. A second conjugate conductor 15 is connected across the remaining diagonally opposite points 16 and 17 of the bridge. Assuming the bridge to be in balance no current will pass through the conjugate conductor 15 as points 16 and 17 will be at equal potential. If now, due to a change in the variable, the resistance 4 is increased, a difference in potential will exist between points 16 and 17 and current will flow through the conjugate conductor 15. This current will have a certain polarity or phase relation with respect to the source 14. If the bridge is unbalanced by a decrease in the resistance 4, a current of opposite polarity or phase with respect to the source 14 will flow through the conjugate conductor 15. By means hereinafter to be described, I employ this change in polarity or phase of the current in the conjugate conductor 15, with respect to the polarity or phase of the current produced by the source 14, to selectively operate the motor 9 in one direction or another to vary the resistance 8 in proper sense to maintain the Wheatstone bridge 5 in balance.

The motor 9 is shown as having opposed pole windings 18 and 19 and an alternating current field winding 20 energized by a source 14A. If the pole winding 18 is short circuited the motor will rotate in one direction and if the winding 19 is short circuited the motor will rotate in opposite direction. If both windings 18 and 19 are simultaneously short circuited the motor will not rotate in either direction.

Upon an unbalance of the bridge 5, the particular winding short circuited to produce rotation of the motor 9 is determined by the polarity or phase of the current in the conjugate conductor 15. Rotation of the motor 9 will vary the resistance 8 in proper direction to restore the bridge to balance. It is evident that upon a slight change in the resistance 4 the current in the conjugate conductor 15 will be of relatively small magnitude. So that such minute currents may be used to control the selective short circuiting of the windings 18 and 19 I provide electrical amplifying means.

Connected in the conjugate conductor 15 is the primary 21 of a transformer 22 having a secondary 23, the opposite terminals of which are connected to the grids 24 and 25 of electron discharge devices 26 and 27 respectively. The device 27 has an output circuit which includes an anode 28 connected through a resistance 29 to one side of a direct current source 30, and a cathode 28A which is connected through a resistance 31A to a center tap in the secondary 23 and to the opposite side of the source 30. The output circuit arrangement of the device 26 is similar to that of the device 27. The anode 31 being connected through a resistance 32 to one side of the direct current source 30, whereas the cathode 33 is connected to the center tap of the secondary 23 and to the opposite side of the source 30 through the resistance 31A. Assuming that no current passes through the conjugate conductor 15, so that no voltage is induced in the secondary 23, it is evident that by proper circuit arrangements the devices 26 and 27 may be made to pass currents of predetermined magnitude through their output circuits, or if desired the grids 24 and 25 may be sufficiently biased so that both devices are substantially non-conducting. Assuming now that alternating current is passing through the conjugate conductor 15, by virtue of the fact that the grid 24 is connected to the opposite terminal of the secondary 23 than is the grid 25, then when the grid 25 is being made more positive with respect to the anode 28, the grid 24 is being made more negative with respect to the anode 31. Upon a reversal of the alternating current in the conjugate conductor 15 the reverse will occur, the grid 24 then being made more positive with respect to the anode 31 and the grid 25 being made more negative with respect to the anode 28. With alternating current passing through the conjugate conductor 15 a pulsating current will therefore pass through the output circuits of the electron discharge devices 26 and 27 and by virtue of the amplifying characteristics of the transformer 22 and of the devices 26 and 27 the current passing through the output circuits will be greater than that passing through the conjugate conductor 15. As hereinbefore stated, the polarity of the current in the conjugate conductor 15 depends upon the sense of change in the resistance 4. Likewise the polarity of the current in the output circuits of the devices 26 and 27 will depend upon the sense of change in the resistance 4.

The pulsating current passing through the output circuits of the devices 26 and 27 is utilized to control the current transmission through a second pair of electron discharge devices 40 and 41, the output circuits of which are inductively coupled through transformers 42 and 43 to the circuits of the pole windings 18 and 19 respectively. Upon the device 41 being rendered conducting, the impedance of the primary of the transformer 43 is lowered sufficiently so that the winding 19 is effectively short circuited, causing rotation of the motor 9 in one direction. Likewise when the device 40 is rendered conducting the impedance of the primary of the transformer 42 is sufficiently decreased so that the winding 18 is effectively short circuited, causing rotation of the motor 9 in opposite direction. The transformers 42 and 43 may be considered as the current source for the devices 40 and 41. In the embodiment shown in Fig. 1 I preferably arrange the devices 40 and 41 so that they are of the same polarity, that is the anodes of the devices are simultaneously positive and negative with respect to their associated cathode. During the half cycle when the anodes are positive the devices may be rendered conducting or non-conducting by control of the grid or input circuits, as will be understood by those familiar with the art. When the anodes are negative with respect to their associated cathodes, the devices are substantially non-conducting regardless of the potential relation which may exist between the grid and cathode.

The pulsating component of the current in the output circuits of the devices 26 and 27 is impressed upon the grids of the devices 40 and 41 through condensers 44 and 44A which inhibit the passage of direct current. It will therefore be solely the component of the current in the output circuit of the devices 26 and 27 produced by the flow of current in the conjugate conductor 15 which will be effective for controlling the grid-cathode potential relationship of the devices 40 and 41. As the devices 40 and 41 have the same polarity the particular device rendered conducting during each half cycle when the proper anode-cathode potential relationship exists will be determined by the polarity of the current passing through the conductor 15. That is to say upon unbalance of the bridge in one sense the polarity of the current in the conjugate conductor 15 will be such that the grid of the device 41 will be rendered positive during the half cycle when the anode thereof is positive with respect to its cathode, so that the device will be rend ed conducting. If, however, the bridge had been unbalanced in the opposite direction, then during the same half cycle the grid of the device 41 would have been rendered negative with respect to the potential of its cathode so that that device would have remained non-conducting. In the latter case, however, the grid of the device 40 would have been rendered more positive with respect to the potential of the cathode, so that it would have been rendered conducting. The particular pole winding of the motor 9 which is energized upon unbalance of the bridge is selectively determined therefor in dependence upon the sense of unbalance of the bridge. As hereinbefore described, operation of the motor 9 serves to position the index 1 and also to vary the balancing resistance 8 to restore the bridge to balance. As well understood, the magnitude of the resistance 8 and accordingly the position of the index 1 is a measure of the magnitude of the resistance 4 and accordingly of the variable to which the latter is responsive.

Normally, that is when no current passes through the conjugate conductor 15, devices 40 and 41 may be maintained non-conducting or conducting at predetermined amounts as desired. This may be accomplished by providing suitable grid biases. In Fig. 1 such bias is obtained by connecting the grids of the devices 40 and 41 through resistances 40A and 41A to a voltage divider 30A which spans the source 30. As shown, the grids of the devices 40 and 41 have a negative bias with respect to their associated cathodes. The bias may be varied by shifting the point of their connection to the voltage divider 30A.

Figure 2:
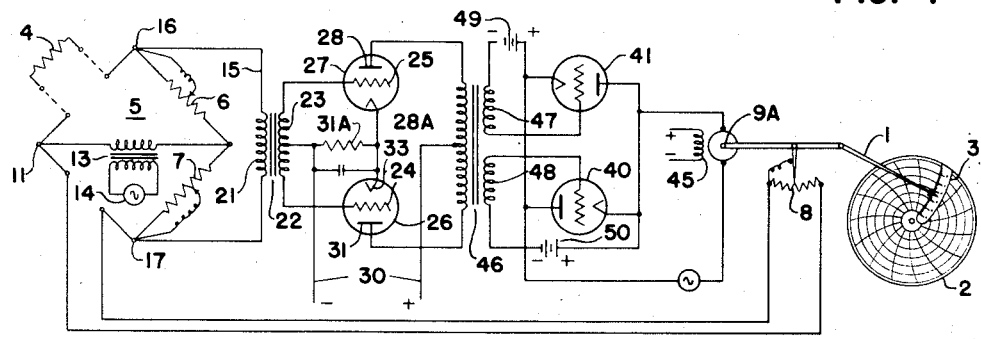
Fig. 2 illustrates a modified form of the embodiment of my invention shown in Fig. 1.

In Fig. 2 I show a modification of the embodiment of my invention illustrated in Fig. 1, wherein the position of the index 1 and magnitude of the resistance 8 is varied by means of a motor 9A having a field winding 45 energized from a suitable source of direct current and an armature winding which is connected in an alternating current circuit including the devices 40 and 41. In this modification, upon the device 41 being rendered conducting, pulsating direct current of selected direction will pass through the armature of the motor 9A effecting rotation in a given direction. Upon the device 40 being rendered conducting pulsating direct current of opposite direction will pass through the armature effecting rotation in opposite direction. In place of the resistances 29 and 32 in the output circuits of the devices 26 and 27 there is shown a transformer 46, which upon an alternating or pulsating component being present in the current in the output circuits of the devices 26 and 27 will induce a similar pulsating or alternating component in the secondaries 47 and 48 which are connected in the grid circuits of the devices 40 and 41.

A suitable grid bias may be provided for the devices 40 and 41 by any suitable direct current source. In Fig. 2, for example, I have shown batteries 49 and 50 respectively. Assuming the Wheatstone bridge 5 to be in balance, the grid-cathode potential relationship of the devices 40 and 41 will be determined by the grid bias batteries 49 and 50. Upon an unbalance of the bridge 5, however, there will be superimposed upon the potential produced by the batteries 49 and 50 a pulsating current component which will be of proper polarity to selectively render either the device 40 or 41 conducting during the half cycle when its anode is positive with respect to its cathode. During periods when the bridge is in balance, it is apparent that no current will pass through the transformer 46. The grid bias of the devices 40 and 41 may be such that both devices are normally non-conducting, or the bias may be so arranged that both devices are conducting so that normally alternating current will pass through the armature winding of the motor 9A.

In the embodiments of my invention shown in Figs. 1 and 2 I have utilized two electron discharge devices (26, 27) to amplify the current flow in the conjugate conductor 15 sufficiently to properly control the electron discharge devices 40 and 41. The arrangement shown is frequently referred to as a "push-pull" arrangement in that the devices 26 and 27 act to amplify the current in the conjugate conductor 15. In the embodiment of my invention shown in Fig. 3 I disclose an alternate arrangement wherein a single electron discharge device 51 is used to properly control the devices 40 and 41. In this embodiment the devices 40 and 41 are preferably arranged in circuit to have opposite polarity, that is the anode of the device 41 is positive during one half cycle and the anode of the device 40 is positive during the remaining half cycle. Unbalance of the bridge in one sense will then produce a current of the same polarity as the device 41 for example, effecting rotation of the motor 9 in one direction. Unbalance of the bridge in opposite direction will produce a current having the same polarity as the device 40 and accordingly effect operation of the motor 9 in opposite direction.

The output circuit of the device 51 is shown as including the source of direct current 30 and a resistance 52. The grid of the device 51 may be biased so that it is non-conducting or conducting a predetermined amount. Such direct current as normally flows through the output circuit of the device 51 has no effect upon the potential impressed upon the grids of the devices 40 and 41 by virtue of a condenser 53. Upon passage of alternating current through the conjugate conductor 15 however the current in the output circuit of the device 51 becomes pulsating in character, which will pass through the condenser 53 and render either the device 40 or 41 conducting selectively in accordance with the sense of unbalance of the bridge 5.

Figure 3:
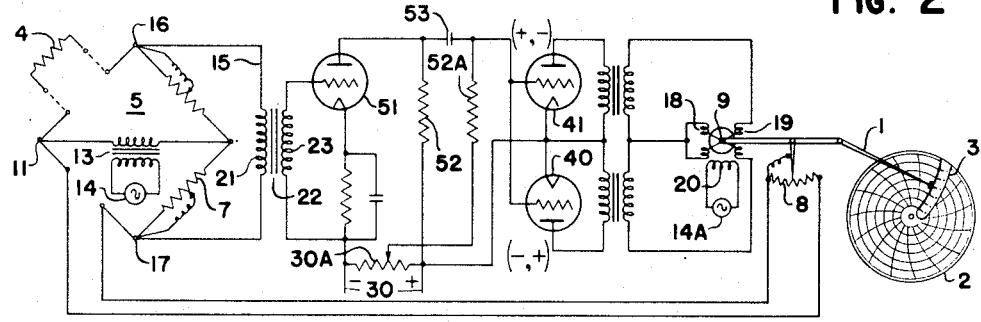
Fig. 3 illustrates diagrammatically another embodiment of my invention.

As explained with reference to Fig. 1 the devices 40 and 41 may normally be maintained non-conducting. In Fig. 3 this is accomplished by connecting the grids through a resistance 52A to the voltage divider 30A. To provide a high degree of sensitivity in some cases it may be preferable to maintain the devices 40 and 41 normally conducting, in which case a pulsating current originating due to unbalance of the bridge 5 will selectively render one or the other of the devices more conducting.

Figure 4:
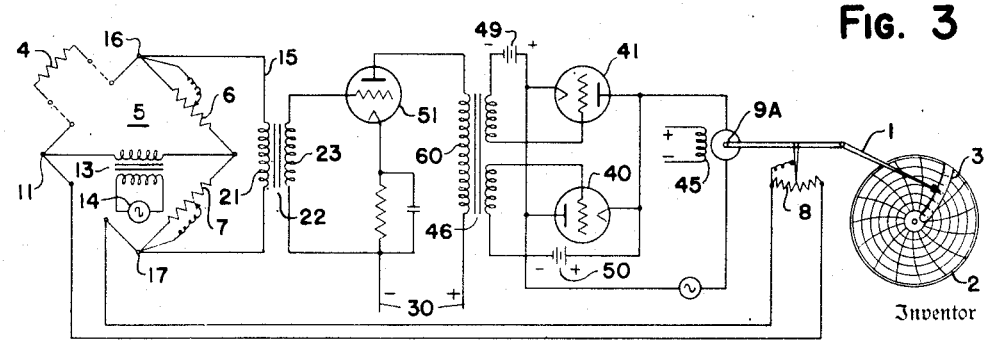
Fig. 4 is an illustration of a modified form of the embodiment of my invention shown in Fig. 3.

In Fig. 4 I show a further modification of my invention wherein the electron discharge device 51 is utilized to control operation of a motor 9A as shown in Fig. 2. In this modification the secondary 60 of a transformer 61 is connected in the output circuit of the device 51. Upon a pulsating current occurring in the output circuit of the device 51 such will be induced in the grid circuits of the devices 40 and 41. The current so induced will selectively render either one or the other of the devices conducting depending upon the sense of unbalance of the bridge 5.

In reference to Figs. 1-4, inclusive, I have indicated that the impedance 4 may be considered as any element capable of producing an electrical effect varying in correspondence with a variable. In Figs. 5-9, inclusive, I disclose specific arrangements for the measurement of typical variables. For example, in Fig. 5 I have illustrated the impedance 4 as being positioned in a well 60 disposed in a pipe 61 through which a fluid flows. The impedance 4 will, if made of suitable material, vary in consonance with changes in the temperature of the fluid flowing through the pipe, and hence the index 1 will be positioned proportionate to changes in the temperature of the fluid.

Figures 5, 6, 7:
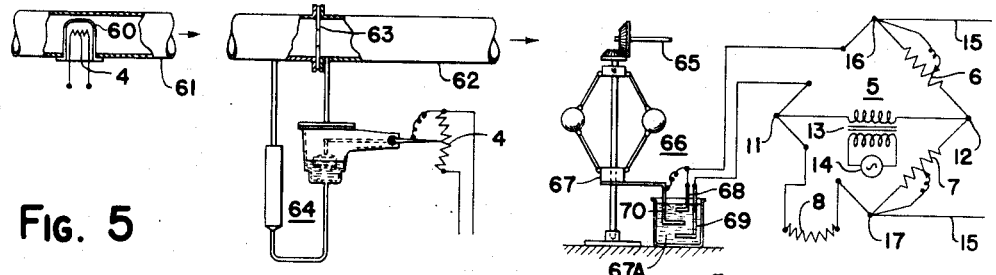

In Fig. 6 I show an arrangement wherein the impedance 4 is varied in accordance with the rate of flow of a fluid through a conduit 62. In the specific embodiment shown there is positioned in the conduit 62 an orifice 63 for producing a differential pressure varying in functional relation to the rate of flow of fluid. The differential pressure produced serves to operate a meter 64 arranged to position a contact along the resistance 4. With this arrangement the index 1 will be positioned proportionately to changes of flow within the conduit 62.

In Fig. 7 I disclose a circuit arrangement whereby the index 1 may be positioned proportionately to the speed or angular velocity of a body. Therein there is shown a rotatable shaft 65, the speed of which it is desired to measure, arranged to actuate a fly ball governor 66. As known, as the speed of the shaft 65 increases, the rotating members of the governor will move outwardly, thereby causing a collar 67 to be vertically positioned proportionate to the speed of the shaft 65. Vertical movements of the collar 67 are used to vary a resistance proportionately. Conveniently the resistance may take the form of an electrolite 67A in which are two suitably spaced stationary electrodes 68 and 69 between which is positioned an electrode 70 moved by the collar 67. It is evident that the resistance will depend upon the position of the electrode 70 relative to the electrodes 68 and 69, which in turn will depend upon the position of the collar 67 or speed of the shaft 65. The remainder of the circuit arrangement may be as shown in Figs. 1-4, inclusive, and the index 1 will be moved in proportion to changes in the speed of the shaft 65.

In Fig. 8 I show a modification wherein the collar 67 is utilized to vary a reactance such as an inductance 4A connected in one arm of the bridge 5. Preferably in the arrangement shown in Fig. 8 in the opposed ratio arm an adjustable inductance is inserted, designated as 6A. The bridge may be maintained in balance by any of the circuit arrangements shown in Figs. 1-4, inclusive.

In Fig. 9 I show a further modified form wherein the reactance varied in correspondence with a variable is shown as a condenser 4B. Therein I show the collar 67 arranged to relatively position the plates of the condenser 4B. In the opposed ratio arm of the bridge 5 is shown a fixed capacitance 6B. The bridge may be maintained in balance by any of the circuit arrangements shown in Figs. 1-4 inclusive.

Frequently the electrical effect produced by a sensitive device does not vary in lineal proportion to variations in the variable. In order that the index 1 may be moved in direct proportion to changes in the variable rather than in lineal proportion to changes in the electrical effect, various means may be employed for compensating for the non-lineal functional relation existing. In Figs. 10-13 I have diagrammatically illustrated various means which may be employed. In Fig. 10 I show the resistance 8 as being shaped or non-uniform, so that equal increments of movement of the motor 9 do not produce equal changes in resistance. By properly shaping the resistance 8 it will be evident that any non-linear function existing, for example, between changes in temperature and changes in resistance of the element 4 may be properly compensated.

In Fig. 11 I show the resistance 8 varied through a cam 72 mounted on the shaft of the motor 9. The cam 72 may be shaped so that any desired non-linear functional relation may exist between movements of the motor 9 and corresponding changes in the resistance 8.

In Fig. 12 I show the resistance 8 as being uniform and positioned directly by the motor 9. Index 1 is, however, positioned by the motor 9 through a cam 73 which may be shaped to compensate for any functional relation which may exist between changes in the magnitude of the variable and changes in the electrical effect produced thereby.

In Fig. 13 I show a special arrangement of the Wheatstone bridge 5 which may be used in some cases to compensate for a non-linear functional relation existing between changes in the variable and electrical effect. In the arrangement shown in Fig. 13 the balancing resistance 8 is not located entirely in one of the ratio arms of the bridge but is partially included in two adjacent arms. Movements of the motor 9 do not vary the magnitude of the resistance 8, but vary the proportion of the resistance in the adjacent ratio arms. That is to say movements of the motor 9 change the point of connection of the conjugate conductor 15 to the bridge. With this arrangement movements of the motor 9 necessary to maintain the bridge in balance will not be in linear proportion to changes in the sensitive element 4, but will bear a non-linear functional relation thereto. In some instances this functional relation will be the same as or approximately the same as the functional relation existing between changes in the variable and changes in the electrical effect, and accordingly the one may be made to compensate for the other.

In Fig. 14 I illustrate a Wheatstone bridge arrangement whereby the ratio between two variables may be determined. For purposes of illustration I have disclosed the bridge arranged to determine the ratio between two rates of fluid flow. The resistance 4 is varied in accordance with the rate of flow of fluid through a conduit 80, whereas the resistance 6 is varied in accordance with the rate of flow of fluid through a conduit 81. As will be appreciated by those familiar with the art, the magnitude of the resistance 8 necessary to maintain the bridge in balance will be directly proportional to the ratio existing between the fluid flows in the conduits 80 and 81.

Figure 15:
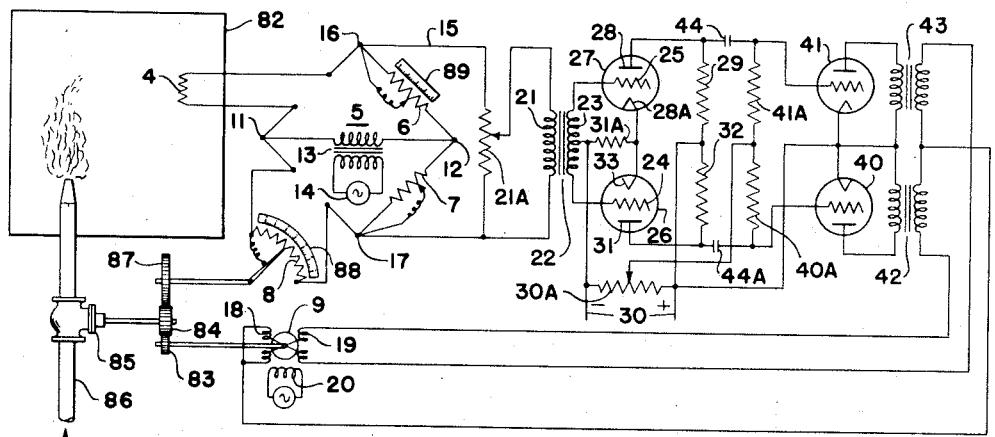
Figs. 15 and 16 illustrate the application of my invention to the control of an agent producing or maintaining a variable.

My invention may be readily arranged to regulate the rate of application of a corrective agent to maintain the magnitude of a variable at a predetermined value. As specific illustrations I have shown in Figs. 15 and 16 my invention arranged to control the fuel flow to a furnace 82 to maintain the temperature therein at a predetermined desired value. In the control art two general types of control are recognized which are classified as "geared" and "floating." In a "geared" control for each and every value of the variable within a certain range there exists a predetermined rate of supply of corrective agent, that is to say there is a definite relation between magnitude of the variable and rate of supply of corrective agent, and hence the rate of supply of corrective agent may be said to be geared to the variable. In a "floating" control upon a departure of the variable from desired value the rate of supply of corrective agent is continuously varied until the variable returns to the desired value. There is no relation between magnitude of the variable and rate of supply of corrective agent. "Geared" control is particularly stable, and does not tend to set up a hunting cycle in the system causing the variable to oscillate. In some instances however it is unsatisfactory in that it does not maintain the variable at a predetermined magnitude, but permits variations therein, depending upon the load on the system. "Floating" control in some instances results in an unstable system which sets up oscillations in the magnitude of the variable. On the other hand, it does control the rate of supply of corrective agent to maintain the variable exactly at the desired value. The type of control applicable in any particular case depends upon the conditions incident to that case, as will be appreciated by those familiar with the art. In Fig. 15 I have illustrated a geared control and in Fig. 16 a floating control.

Referring to Fig. 15, the impedance 4 is shown as located within the furnace 82 so as to be sensitive to the temperature therein. The motor 9 through suitable spur gears 83 and 84 positions a valve 85 disposed in a fuel line 86 supplying fuel to the furnace 82. The motor 9 through a gear 87 also serves to vary the balancing resistance 8 to maintain the bridge 5 in balance. As shown, the contact arm utilized to vary the resistance 8 may be arranged to cooperate with a suitably graduated scale 88 to indicate the temperature existing within the furnace 82.

As described with reference to Fig. 1, the motor 9 will assume a definite position for each magnitude of the impedance 4, and hence for each magnitude of the variable to which the impedance 4 is sensitive. Inasmuch as the valve 85 is geared to the motor 9, it follows that for each and every value of temperature within the furnace 82 there will be a definite opening of the valve, and accordingly a definite rate of fuel flow to the furnace. In operation, upon a decrease in temperature within the furnace 4, for example, the motor 9 will be positioned a proportionate amount in a direction to open the valve 85, thereby increasing the rate of fuel flow to the furnace which will prevent a further decrease in temperature therein and tend to restore the temperature therein to the desired or predetermined magnitude. Simultaneously with the positioning of the valve 85 in an opening direction the contact arm engaging the resistance 8 will be positioned relative to the scale 88 to indicate the actual temperature existing within the furnace 82.

By proper design and arrangement of the Wheatstone bridge 5 the range in temperature within the furnace 82 necessary to move the valve 85 from a full closed to a full open position may be made relatively small. In some applications it is desirable to operate the furnace 82 at widely different temperatures at various times. I may provide for such desired changes in the magnitude of the temperature maintained within the furnace 82 by manually adjusting the magnitude of the resistance 8. For convenience a graduated scale 89 may be placed adjacent the resistance 8 so that an operator may be advised of the particular magnitude of temperature within the furnace 82, which the control will tend to maintain.

Preferably the rate at which the corrective agent is changed in response to a given change in the controlled variable is adjustable. In Fig. 15 I accomplish this by incorporating in the conjugate conductor 15 an adjustable resistance 21A in parallel with the primary 21 of the transformer 22. The amplitude of the current in the primary 21 produced by a given change in temperature may be controlled by adjustment of the resistance 21A. In this manner the degree of energization of the windings 18 or 19 produced by a given unbalance of the bridge 5 may be varied, and hence the speed of the motor 9 and rate of change in the corrective agent likewise varied.

Figure 16:
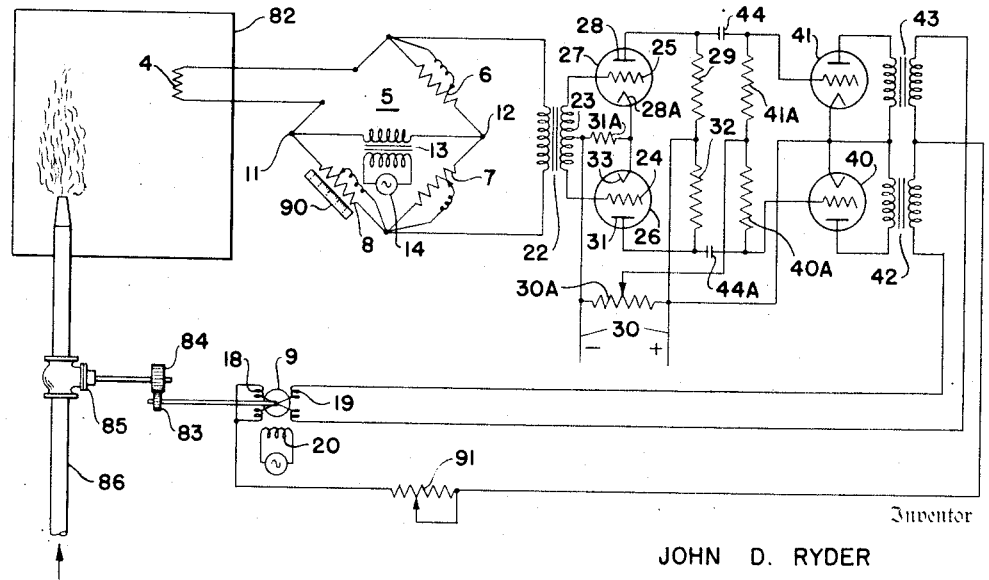

Referring now to Fig. 16, which as before stated represents a "floating" control, the motor 9 as in Fig. 15 positions the valve 85 through gears 83 and 84. The motor 9, however, does not vary the magnitude of the resistance 8 to maintain the bridge in balance. Assuming the system to be in equilibrium, it will be evident that upon a change in temperature, causing an unbalance of the bridge, the motor 9 will continue to operate, varying the rate of fuel flow to the furnace, until the bridge is rebalanced by restoration of the temperature within the furnace 82 to the desired value. The particular temperature maintained by the control system may be varied by manual adjustment of the resistance 8, which may be provided with a suitable graduated scale 90 to give a visual indication of the particular temperature which will be maintained. To avoid unstable operation of the control, that is operation setting up undesirable oscillations in the temperature within the furnace 4, I show connected in the circuit of the motor 9 adjustable resistance 91, which may be varied to control the speed of the motor 9. By increasing the magnitude of the resistance 91, for example, the time required for the valve 85 to move from a full closed to a full open position for a given departure of the temperature within the furnace 82 from the desired magnitude may be increased. Conversely, decreases in the magnitude of the resistance 91 will shorten the time required for the valve 85 to move from a full closed to a full open position for a given departure of the temperature within the furnace 82 from the desired value.

The foregoing description serves merely to illustrate, by specific applications, the principles of my invention and should not be taken as defining the scope thereof.

What I claim as new, and desire to secure by Letters Patent of the United States, is:

1. Apparatus comprising means responsive to the magnitude of a variable for establishing an alternating current potential of variable polarity relative to a source of alternating current in accordance with the sense of change in the magnitude of a variable, means including electron discharge means for amplifying the magnitude of said potential, a pair of electron discharge devices each having an input and an output circuit, a motor having opposed pole circuits and an energizing alternating current field winding, an inductive coupling between each of said output circuits and one of said pole circuits, said output circuits arranged to have opposite polarity, the input circuits of said devices connected to said amplified potential of variable polarity whereby one or the other of said devices is rendered conducting and one or the other of said pole windings is effectively short circuited to thereby produce rotation of said motor in a direction depending upon the polarity of said amplified potential.

2. Apparatus comprising in combination, a Wheatstone bridge having four ratio arms, a variable reactance in one of the ratio arms, a balancing reactance in another of the ratio arms, a first conjugate conductor, a source of alternating current connected in said first conjugate conductor, a second conjugate conductor connected across the remaining diagonally opposite points of the bridge, electromagnetic means operable in opposite directions for varying said balancing resistance to maintain said bridge in balance, and electrical means for controlling the direction of operation of said electromagnetic means in dependence upon the relative polarities between the current flows in said conjugate conductors, said electrical control means including a pair of electron discharge devices each having an input circuit, said input circuits being operatvely connected to said second conjugate conductor, each of said electron discharge devices having an output circuit, means for energizing the output circuits including said source of alternating current, a coil in each output circuit, an electric coupling means between said source, said coils, and said electromagnetic means for rendering said electromagnetic means directionally responsive to variations in polarity of current flowing in said second conjugate conductor.

3. Apparatus comprising in combination, a Wheatstone bridge having four ratio arms, a variable impedance in one of the ratio arms, a balancing impedance in another of the ratio arms, a first conjugate conductor, a source of alternating current connected in said first conjugate conductor, a second conjugate conductor connected across the remaining diagonally opposite points of the bridge, electromagnetic means operable in opposite directions for varying said balancing impedance to maintain said bridge in balance, and electrical means for controlling the direction of operation of said electromagnetic means in dependence upon the relative polarities between the current flows in said conjugate conductors, said electrical control means including a pair of electron discharge devices each having an input circuit, said input circuits being operatvely connected to said second conjugate conductor, each of said electron discharge devices having an output circuit, means for energizing the output circuits including said source of alternating current, a coil in each output circuit, an electric coupling means between said source, said coils, and said electromagnetic means for rendering said electromagnetic means directionally responsive to variations in polarity of current flowing in said second conjugate conductor.

4. A temperature measuring device comprising a Wheatstone bridge having four ratio arms and two conjugate conductors, a resistance in one of the ratio arms variable in accordance with the temperature to be measured, a source of alternating current in one of the conjugate conductors, a balancing resistance in another of the ratio arms and means for varying said balancing resistance to maintain it in predetermined ratio to said variable resistance comprising a pair of electron discharge devices including input and output circuits, means electrically connecting the input circuits of said electron discharge devices to said second conjugate conductor for rendering one or the other of said devices conducting in correspondence with the relative phase of the alternating current in the two conjugate conductors, electromagnetic means having plural energizing windings effective to render said means directionally responsive to effect energization of one or the other of said windings, circuit means each including one of said windings and a coil, said coils being inductively coupled with the output circuits of said electron discharge devices, respectively, means for simultaneously energizing said circuits from said alternating current source whereby to effectively short-circuit one of said windings which is connected to the electron discharge device which at the moment is conducting, and means operable by said electromagnetic means for increasing or decreasing said balancing resistance to maintain said predetermined ratio under the control of the space current in said electron discharge devices.

5. A temperature regulator comprising a Wheatstone bridge having four ratio arms and two conjugate conductors, a first resistance in one of said arms variable in correspondence with the temperature to be regulated, a second resistance in another of said arms variable in correspondence to the rate of application of an agent producing or maintaining the temperature, a source of alternating current connected in one of said conjugate conductors, and means for maintaining said bridge in balance comprising a pair of electron discharge devices, means for rendering one or the other of said devices conducting in correspondence with the polarity of the alternating current in the other conjugate conductor occasioned by a loss of bridge balance and means responsive to the space current through said devices for concurrently varying said second resistance and the rate of application of the corrective agent in sense dependent upon which one of said devices is rendered conducting so that said balancing resistance is varied to restore the bridge to balanced condition.

6. Apparatus for determining the ratio between two variables comprising a Wheatstone bridge having four ratio arms and two conjugate conductors connected to diagonally opposite points of the bridge, a source of alternating current connected in one of the conjugate conductors, a resistance in one of said arms variable in correspondence with one of said variables, a resistance in another of said arms variable in correspondence with the other of said variables, a balancing resistance in another of said arms and means for varying the magnitude of said balancing resistance to maintain said bridge in balance so that the magnitude thereof becomes a measure of the ratio between said variables comprising a pair of electron discharge devices, means including means responsive to the polarity of the current in the other of the conjugate conductors occasioned by unbalance of the bridge for selectively rendering one or the other of said devices conducting, and reversible means for varying said balancing resistance operable in a direction depending upon which one of said devices is rendered conducting.

7. Apparatus comprising in combination, a balanceable network including a variable impedance and a balancing impedance, a source of alternating current for energizing said network, variations in the magnitude of said variable impedance unbalancing said network and causing an alternating current voltage between two points in said network of one phase upon unbalance of said network in one sense and of opposite phase upon unbalance of said network in opposite sense, and means for maintaining said network in balance comprising a pair of electron discharge devices, means for rendering one or the other of said devices more conducting in dependence upon the phase of the alternating voltage between said points in said network, and means directionally responsive to the space current through said devices for adjusting said balancing impedance to maintain said bridge in balance, said last-mentioned means including a reversible motor having plural directional energizing windings, circuit means for concurrently energizing said windings, said circuits including means inductively coupling said circuits to said electron discharge devices, respectively, for effectively short-circuiting one or the other of said windings by passage of space current through said respective electron discharge devices.

8. Apparatus comprising in combination, a balanceable network including a variable impedance and a balancing impedance, a source of alternating current for energizing said network, a pair of electron discharge devices each having a plate, a grid and a cathode, a source of alternating current for energizing the plate circuits of said devices, means electrically coupling the grids of said devices to selected points in said network so that one or the other of said devices is rendered conducting selectively in accordance with the sense of unbalance of said network, an energizing coil in each plate circuit, an energizing circuit for each energizing coil, said energizing circuits including coils inductively coupled to the energizing coils, respectively, said second-mentioned alternating current source being inductively coupled to both energizing circuits, and reversible means having plural operating windings and operated in one direction or the other for adjusting said balancing resistance to restore said network to balanced condition, the respective operating windings of said reversible means being connected to said respective energizing circuits, whereby flow of space current in one or the other of said electron discharge devices will effectively short-circuit the operating winding of said reversible means which is connected thereto by the respective energizing circuit.

9. Apparatus comprising in combination, a balanceable network including a variable impedance and a balancing impedance, a source of alternating current for energizing said network, a pair of electron discharge devices having their plate circuits energized from said source of alternating current and arranged so that their plate potentials are of opposite polarity and the input circuits of which are electrically coupled to said balanceable network so that one or the other of said devices is rendered more conducting upon unbalance of said network selectively in dependence upon the sense of unbalance of said network, and reversible means for adjusting said balancing impedance operable in a direction depending upon which one of said devices is rendered more conducting.

10. Apparatus comprising in combination, a balanceable network including a variable impedance and a balancing impedance, a source of alternating current for energizing said network, means for varying said variable impedance to thereby unbalance said network and set up an alternating voltage between two points in said network of one phase upon unbalance of said network in one sense and of opposite phase upon unbalance of said network in opposite sense, a pair of electron discharge devices, a source of alternating current for energizing the plate circuits of said devices, said devices arranged so that their plates are of opposite polarity and the input circuit of one electrically coupled to one of said points and the input circuit of the other electrically coupled to the other of said points so that the impedances of the plate circuit of said devices are differentially varied selectively in dependence upon the sense of unbalance of said network, and means controlled by the current in the output circuits of said devices for adjusting said balancing impedance in a direction to restore said network to balance after departure therefrom.

11. Apparatus comprising in combination, a balanceable network including a variable impedance and a balancing impedance, a source of alternating current for energizing said network, variations in the magnitude of said variable impedance unbalancing said network and causing an alternating voltage between two points in said network of one phase upon unbalance of said network in one sense and of opposite phase upon unbalance of said network in opposite sense, and means for maintaining said network in balance comprising, an electron discharge device having an input and an output circuit, means for energizing the input circuit of said device with the alternating current voltage between said points, a source of direct current for energizing the output circuit of said device, a pair of electron discharge devices each having an anode, a cathode and a grid, the cathode-anode circuits of said last named devices energized by said source of alternating current, the anodes of said devices arranged to be of opposite polarity, the grids of said last named devices connected to the output circuit of said first named device so that one or the other of said last named devices is rendered conducting selectively in accordance with the sense of unbalance of said network, and means for adjusting said balancing impedance to rebalance said network positioned in one direction upon one of said electron discharge devices being rendered conducting and in reverse direction upon the other of said electron discharge devices being rendered conducting.

12. Apparatus comprising in combination, a balanceable network including a variable impedance and a balancing impedance, a movable element for adjusting the latter, variations in the magnitude of said variable impedance unbalancing said network and causing an alternating voltage between selected points in said network of one phase upon unbalance of said network in one sense and of opposite phase upon unbalance of said network in opposite sense, means including an electron discharge device for amplifying said last named voltage, a pair of electron discharge devices each having a plate, a grid and a cathode, the plate circuits of said devices energized by said source of alternating current, said devices so arranged that their plates are of opposite polarity, means for impressing the amplified voltage corresponding to the alternating current voltage between said points on the grids of said last named devices so that one or the other of the grids is rendered less negative during the half cycle when its anode is positive and the electron discharge device rendered more conducting, and means for positioning said element so that said balancing impedance is adjusted to rebalance said network operated in one direction upon one of said electron discharge devices being rendered conducting and in reverse direction upon the other of said electron discharge devices being rendered conducting.

13. Apparatus comprising in combination, a balanceable network including a variable impedance and a balancing impedance, a movable element for adjusting the latter, variations in the magnitude of said variable impedance unbalancing said network and causing an alternating voltage between selected points in said network of one phase upon unbalance of said network in one sense and of opposite phase upon unbalance of said network in opposite sense, means for amplifying said last named voltage comprising a first pair of electron discharge devices each having a plate, a grid and a cathode, means for impressing the potential at one of said selected points on the grid of one of said devices and the potential at the other of said selected points on the grid of the other of said devices, a second pair of electron discharge devices each having a grid and a plate circuit, a source of alternating current for energizing said plate circuits, means for impressing the plate potential of one of said first named devices on the grid of one of said second named devices and for impressing the plate potential of the other of said first named devices on the grid of the other of said second named devices, and means for positioning said element to rebalance said network controlled by the space current in said second pair of electron discharge devices.

14. Apparatus for maintaining a variable in correspondence with a second variable comprising in combination, a balanceable network including a first impedance variable in correspondence with changes in said first variable, a second impedance variable in correspondence with said second variable and a source of alternating current for energizing said network, a pair of electron discharge devices having their input circuits electrically coupled to said network so that one of said devices is rendered conducting upon unbalance of said network in one sense and the other of said devices is rendered conducting upon unbalance of said network in opposite sense, and means selectively operated in accordance with which one of said electron discharge devices is rendered conducting for adjusting the magnitude of said first variable in a sense to restore said network to balance.

15. Apparatus comprising in combination, a balanceable bridge circuit including a variable impedance, an adjustable impedance and a source of alternating current for energizing the bridge circuit, a pair of electron discharge devices having their input circuit electrically coupled to said bridge circuit and their plates to said source of alternating current so that one or the other of said devices is rendered relatively more conducting selectively in accordance with the sense of unbalance of said network, and means selectively operated in one direction or the other in dependence upon which one of said devices is rendered more conducting and adapted to simultaneously vary said variable impedance and said adjustable impedance in opposite directions to restore said balanceable bridge circuit to balanced condition.

16. Apparatus comprising in combination, a balanceable bridge circuit including a variable impedance, an adjustable impedance and a source of energizing alternating current, a pair of electron discharge devices having their input circuits electrically coupled to said bridge circuit and their plates to said source of alternating current so that one or the other of said devices is rendered relatively more conducting selectively in accordance with the sense of unbalance of said network, means selectively operated in one direction or the other in dependence upon which one of said devices is rendered relatively more conducting for adjusting said adjustable impedance in a direction to restore said bridge circuit to balance after departure therefrom, means also operated by said last named means for establishing changes in a fluid pressure, and means controlled by said fluid pressure for effecting changes in said variable impedance concurrently with changes in said adjustable impedance.

17. Apparatus comprising in combination, a balanceable bridge network including a variable impedance, a balancing impedance, a source of alternating current for energizing said network so that an alternating voltage is set up between selected points in said network of variable phase relative to said source of alternating current in accordance with changes in the magnitude of said balancing impedance, means including a first pair of electron discharge devices arranged in push-pull relationship for amplifying the alternating current voltage set up between said selected points, a second pair of electron discharge devices each having an anode, a cathode and a grid, a source of alternating current connected in the anode-cathode circuits of said devices so that the anodes of said devices are of the same polarity, the grids of said devices electrically coupled to said first pair of electron discharge devices so as to have opposite polarity whereby one or the other of said second electron discharge devices is rendered conducting depending upon which one of said grids has an applied potential of the same polarity as its associated anode, reversible means operated in one direction or the other in dependence upon which one of said devices is rendered conducting, and a movable element for adjusting said balancing impedance positioned by said reversible means.

18. Apparatus comprising in combination, a balanceable network including a variable impedance and a balancing impedance, a source of alternating current for energizing the network, variations in said variable impedance unbalancing said network and setting up an alternating current potential between selected points in said network, an alternating current motor having a continuously energized alternating current field, a rotor, and wire-wound shading coils on the pole pieces, one of said coils disposed to effect, when energized, forward rotation of the motor and the other of said coils disposed to effect, when energized, reverse rotation of the motor, a movable element for adjusting said balancing impedance positioned by said motor, and means to control the operation of said motor to cause said element to be positioned to rebalance said bridge, comprising, a pair of electron discharge devices each having a plate, a grid and a cathode, means including a transformer coupling the wire-wound shading coils of the motor to the respective plates of the electron discharge devices, said electron discharge devices arranged so that their plates are positive during alternate half cycles of the alternating current supplied the plates from the wire-wound shading coils of the motor and the grids during said half cycles negative so that said electron discharge devices are non-conducting, and means coupling the grids of said electron discharge devices to said points on said bridge so that upon a voltage between said points the grid of one or the other of said electron discharge devices is rendered less negative during the half cycle that its plate is positive depending upon the phase of the said voltage and said device rendered conducting so that the wire-wound shading coil coupled to the plate of said device is effectively energized and said motor rotated in predetermined direction to position said element to rebalance said network.

JOHN D. RYDER.